(12) United States Patent
Hu et al.

(10) Patent No.: US 12,361,736 B2
(45) Date of Patent: Jul. 15, 2025

(54) MULTI-STAGE MACHINE LEARNING MODEL TRAINING FOR KEY-VALUE EXTRACTION

(71) Applicant: Oracle International Corporation, Redwood Shores, CA (US)

(72) Inventors: Yazhe Hu, Bellevue, WA (US); Jeaff Wang, Sammamish, WA (US); Mengqing Guo, Redmond, WA (US); Tao Sheng, Bellevue, WA (US); Jun Qian, Bellevue, WA (US)

(*) Notice: Subject to any disclaimer, the term of this patent is extended or adjusted under 35 U.S.C. 154(b) by 295 days.

(21) Appl. No.: 18/149,795

(22) Filed: Jan. 4, 2023

(65) Prior Publication Data

US 2024/0221407 A1 Jul. 4, 2024

(51) Int. Cl.
*G06N 3/08* (2023.01)
*G06F 40/284* (2020.01)
(Continued)

(52) U.S. Cl.
CPC ...... *G06V 30/19147* (2022.01); *G06F 40/284* (2020.01); *G06F 40/30* (2020.01); *G06N 3/08* (2013.01); *G06V 30/1448* (2022.01)

(58) Field of Classification Search
CPC .......... G06V 30/19147; G06V 30/1448; G06F 40/284; G06F 40/30; G06N 3/08; G06N 20/00
(Continued)

(56) References Cited

U.S. PATENT DOCUMENTS 5,737,442 A 4/1998 Alam
5,784,487 A 7/1998 Cooperman
(Continued)

FOREIGN PATENT DOCUMENTS

| CN | 104881488 B | 4/2017 |
|---|---|---|
| CN | 106802884 A | 6/2017 |
| EP | 1739574 B1 | 9/2007 |

OTHER PUBLICATIONS

Cinnamon Ai, "Key-Value extraction using Key-Value Extraction", Retrieved from https://cinnamonai.medium.com/key-value-extraction-using-graph-key-value-68718e1a4036, Sep. 30, 2020, pp. 5.
(Continued)

*Primary Examiner* — Charlotte M Baker
(74) *Attorney, Agent, or Firm* — Invoke

(57) ABSTRACT

Techniques for multi-stage training of a machine learning model to extract key-value pairs from documents are disclosed. A system trains a machine learning model using a set of training data including unlabeled documents of various document categories. The initial stage identifies relationships among tokens, or words, numbers, and punctuation, in documents. The system re-trains the machine learning model using a set of training data which includes a particular category of documents while excluding other categories of documents. The second training stage is a supervised machine learning stage in which the training data is labeled to identify key-value pairs in the documents. In the initial training stage, the system sets parameters of the machine learning model to an initial state. In the second stage, the system modifies the parameters of the machine learning model based on the characteristics of the training data set including the documents of the particular category.

20 Claims, 7 Drawing Sheets

(51) Int. Cl.
  *G06F 40/30* (2020.01)
  *G06V 30/14* (2022.01)
  *G06V 30/19* (2022.01)
(58) Field of Classification Search
  USPC .......................................................... 382/159
  See application file for complete search history.

(56) References Cited

U.S. PATENT DOCUMENTS

| | | | |
|---|---|---|---|
| 6,175,844 | B1 | 1/2001 | Stolin |
| 6,336,124 | B1 | 1/2002 | Alam et al. |
| 6,405,175 | B1 | 6/2002 | Ng |
| 7,970,213 | B1 | 6/2011 | Ruzon et al. |
| 8,249,356 | B1 | 8/2012 | Smith |
| 9,495,347 | B2 | 11/2016 | Stadermann et al. |
| 9,613,267 | B2 | 4/2017 | Dejean et al. |
| 9,720,896 | B1 | 8/2017 | Wu et al. |
| 10,241,992 | B1 | 3/2019 | Middendorf et al. |
| 10,706,322 | B1 | 7/2020 | Yang et al. |
| 10,713,524 | B2 | 7/2020 | Duta |
| 10,878,195 | B2 | 12/2020 | Duta |
| 11,288,719 | B2 | 3/2022 | Xu et al. |
| 12,205,395 | B1 * | 1/2025 | Lam ................ G06V 30/414 |
| 2006/0271847 | A1 | 11/2006 | Meunier |
| 2013/0318426 | A1 | 11/2013 | Shu et al. |
| 2014/0064618 | A1 | 3/2014 | Janssen, Jr. |
| 2016/0104077 | A1 | 4/2016 | Jackson et al. |
| 2017/0017647 | A1 * | 1/2017 | Musuluri ................ G06F 16/94 |
| 2017/0220859 | A1 | 8/2017 | Grams |
| 2018/0373952 | A1 | 12/2018 | Bui et al. |
| 2019/0005322 | A1 | 1/2019 | Tripathi et al. |
| 2019/0171704 | A1 | 6/2019 | Buisson et al. |
| 2020/0050845 | A1 | 2/2020 | Foncubierta et al. |
| 2020/0117944 | A1 | 4/2020 | Duta |
| 2020/0311410 | A1 | 10/2020 | Prasad et al. |
| 2021/0019287 | A1 | 1/2021 | Prasad et al. |
| 2023/0084845 | A1 * | 3/2023 | Lu .......................... G06N 20/00 |
| | | | 382/176 |

OTHER PUBLICATIONS

Clausner et al., "The Significance of Reading Order in Document Recognition and its Evaluation", 12th International Conference on Document Analysis and Recognition, 2013, pp. 688-692.

Klampfl et al., "A Comparison of Two Unsupervised Table Recognition Methods from Digital Scientific Articles", D-Lib Magazine, vol. 20, No. 11/12, 2014, 13 pages.

Liu et al., "TableSeer: Automatic Table Extraction, Search, and Understanding", Department of Information Sciences and Technology, 2009, 171 pages.

Pan et al., "Document layout analysis and reading order determination for a reading robot", TENCON 2010—2010 IEEE Region 10 Conference, 2010, 2 pages.

Patel et al., "Abstractive Information Extraction from Scanned Invoices (AIESI) using End-to-end Sequential Approach", Sep. 12, 2020, pp. 6.

Perez-Arriaga et al., "TAO: System for Table Detection and Extraction from PDF Documents", Proceedings of the Twenty-Ninth International Florida Artificial Intelligence Research Society Conference, 2016, pp. 591-596.

Qiao et al., "DavarOCR: A Toolbox for OCR and Multi-Modal Document Understanding", Jul. 14, 2022, pp. 4.

Sassisegarane P., "How to extract structured data from invoices", Retrieved from https://medium.com/nanonets/how-to-extract-structured-data-from-invoices-f7de539eb475, Apr. 30, 2021, pp. 26.

Shiraly K., "Automate Your Invoice Processing: Extract Data From Invoices in 6 Easy Steps", Retrieved from https://www.width.ai/post/how-to-extract-data-from-invoices, Nov. 10, 2021, pp. 21.

Thomas M. Breuel, "Layout Analysis based on Text Line Segment Hypotheses", available online at <https://pdfs.semanticscholar.org/e29b/5846e096fa3e858c8da73eb0dde2bf6f812b.pdf>, 4 pages.

Zhang et al., "TRIE: End-to-End Text Reading and Information Extraction for Document Understanding", Oct. 25, 2021, pp. 10.

* cited by examiner

MULTI-STAGE MACHINE LEARNING MODEL TRAINING FOR KEY-VALUE EXTRACTION

TECHNICAL FIELD

The present disclosure relates to training a machine learning model to perform key-value extraction for documents. In particular, the present disclosure relates to pre-training a machine learning model with a training data set which includes documents of various categories. A system then refines the machine learning model by retraining the same model with documents of a particular category corresponding to a target document category for the model.

BACKGROUND

Organizations store digital copies of physical documents for long-term storage and efficient document retrieval. However, with increasing numbers of documents stored digitally, identifying relevant content among the documents is increasingly time-consuming. Organizations improve access to document content using automatic machine-based analysis of the documents. However, machine-learning systems encounter difficulties when the data set for training the machine learning model is relatively small and the documents have formats and content that vary significantly. For example, invoices and receipts often have very different formats, fonts, and content. As a result, training a machine learning model to identify particular content within invoice images results in reduced accuracy of the machine learning model predictions.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
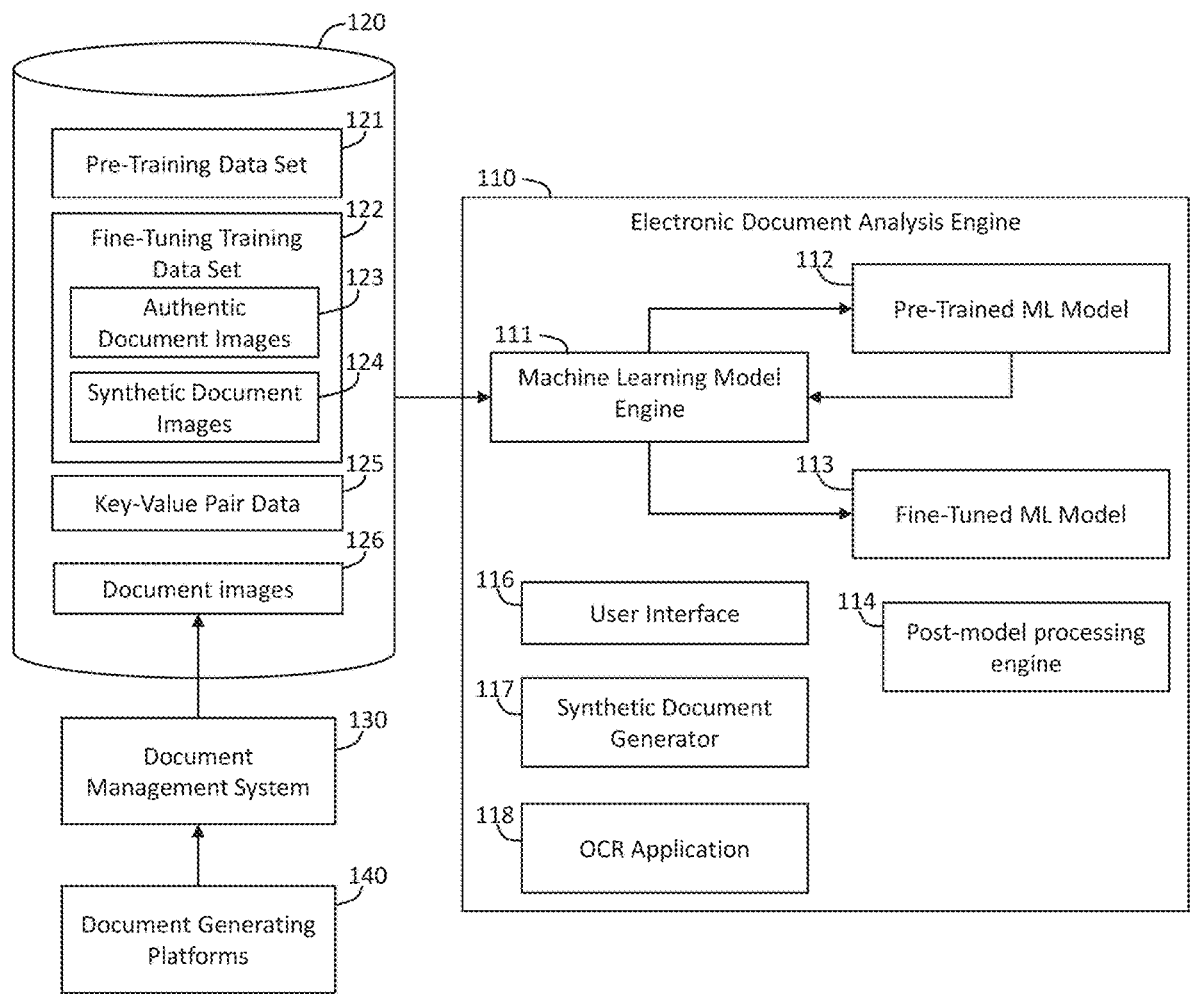
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. MULTI-STAGE MACHINE LEARNING MODEL TRAINING FOR KEY-VALUE EXTRACTION
4. EXAMPLE EMBODIMENT
5. COMPUTER NETWORKS AND CLOUD NETWORKS
6. MISCELLANEOUS; EXTENSIONS
7. HARDWARE OVERVIEW

1. General Overview

Systems utilize machine learning to identify and categorize content in digital documents. However, machine learning models encounter difficulty identifying and categorizing content when training data sets are relatively small and when documents in a training data set have a high variability in document layout.

One or more embodiments include multi-stage training of a machine learning model to extract key-value pairs from documents. A system performs an initial training stage of the machine learning model using a set of training data including unlabeled documents across a variety of categories. The system implements an unsupervised training algorithm to pre-train the machine learning model to generate vectors encoding semantic information, position information, and visual information of tokens within the training documents. The vectors further encode semantic, positional, and visual relationships among the tokens within the training documents. The system performs a second training stage to customize the trained machine learning model. The second training stage involves training with a set of training data corresponding to a particular category of documents while excluding training data corresponding to other categories of documents. The second training stage is a supervised machine learning stage in which the training data is labeled to identify key-value pairs in the documents. For example, the initial training data set may include various types of documents, such as book excerpts, article excerpts, journal entries, forms, receipts, and invoices. The training data set in the second stage may include only invoices labeled with metadata labels to identify key-value pairs in the invoices. In the initial training stage, the system sets parameters of the machine learning model to an initial state. In the second stage, the system modifies the parameters of the machine learning model based on the characteristics of the training data set including the documents of the particular category.

One or more embodiments train the machine learning model in the first training stage via an unsupervised machine learning algorithm to generate vectors for content in the training documents. The vectors encode semantic information, positional information, and visual information of textual content in the training documents. The vectors also encode semantic, positional, and visual relationships among the content in the training documents. A system trains the machine learning model in the second training stage using labeled training documents to (a) generate new vectors encoding semantic information, positional information, and visual information of textual content in the set of labeled training documents, and (b) identify key-value pairs within the labeled set of training documents. The machine learning model identifies the key value pairs based, at least in part, on the vector encodings that encode semantic relationships, positional relationships, and visual relationships among components of the key-value pairs.

One or more embodiments generate a training data set for a second machine learning stage by combining authentic historical documents of a document category with synthetic documents of the same category. For example, a data set may include one thousand images of actual invoices. However, a user may desire to train the machine learning model with ten thousand images. The system may generate nine thousand synthetic invoice images by applying document-generation rules. For example, the system may modify values and positions of tokens within an authentic invoice to generate a synthetic invoice. The rules may specify a particular range of values and particular range of locations within which the system may modify elements from the authentic document to generate the synthetic document.

One or more embodiments apply rule-based post-model processing to further refine machine-generated predictions of key-value pairs in a document. The rule-based post-model processing may combine tokens identified as separate values sharing a same key into a single value of a single key-value pair. The rule-based post-model processing may additionally divide tokens identified by the machine learning model as being a same key or value into separate keys or values of separate key-value pairs. A system may re-train the refined machine learning model based on the rule-based post-model processing of the machine learning model predictions for key-value pairs.

One or more embodiments described in this Specification and/or recited in the claims may not be included in this General Overview section.

2. System Architecture

FIG. 1 illustrates a system 100 in accordance with one or more embodiments. As illustrated in FIG. 1, system 100 includes an electronic document analysis engine 110, a data repository 120, a document management system 130, and document-generating platforms 140. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

The electronic document analysis engine 110 applies machine learning models to identify key-value pairs within documents of particular document categories. Key-value pairs represent data elements within a document that are identified as being associated with each other. For example, a key-value pair may include a name and an address associated with the name. Another key-value pair may include an item and a price associated with the item.

The electronic document analysis engine 110 obtains a pre-training data set 121. The pre-training data set 121 includes a set of unlabeled documents for pre-training a machine learning model. The set of unlabeled documents includes documents of different categories, including: book excerpts, articles, journal entries, magazine articles and excerpts, invoices, and receipts. The set of unlabeled documents includes images of historical documents. For example, book excerpts include images of words on a page, page numbers, and chapter headings. Articles include images of text arranged in multiple columns of a page, graphs, pictures, and footnotes associated with the text. Magazine excerpts include images of words on a page, page numbers, pictures, and graphics. The set of unlabeled documents includes digital images of historical documents. For example, book excerpts, articles, and journal entries are digital images of published documents.

The machine learning model engine 111 trains a machine learning model on the pre-training data set 121 to generate the pre-trained machine learning model 112. In some examples, one or more elements of a machine learning engine may use a machine learning algorithm to encode semantic information, positional information, and visual information of content in documents, such as textual content, as vectors. In some examples, the machine learning algorithm encodes in the vectors semantic, positional, and visual relationship information of tokens within documents. A machine learning algorithm is an algorithm that can be iterated to learn a target model f that best maps a set of input variables to an output variable, using a set of training data. The machine learning algorithm may include unsupervised components to learn the relationships among the tokens in the documents. For example, the system may apply a clustering technique to apply similar vector values to similar pieces of data corresponding to tokens in the documents. In addition, or in the alternative, the system may apply a dimension reduction technique to apply vector values indicating whether a data point is relevant to a data set. Various types of algorithms may be used, including k-means clustering, hidden Markov model, DBSCAN clustering, principal component analysis, T-distributed Stochastic Neighbor Embedding (t-SNE), singular value decomposition, and Association rule predictive analytics. A machine learning algorithm generates a target model f such that the target model/best fits the datasets of training data to the labels of the training data.

The machine learning model engine 111 trains the pre-trained machine learning model 112 to generate vectors encoding semantic information, positional information, and textual information of tokens in the documents of the pre-training data set 121. A token is a set of one or more characters that are on the same row and within a predetermined distance of one another. For example, each word in a row is a separate token. In addition, a number (e.g., "30") is a separate token. Punctuation can be a separate token from adjacent alphanumerical tokens. The system may identify tokens within the document using a tokenizer. The semantic information includes the meaning of a token, such as the meaning of text content. Positional information includes, for example, Cartesian coordinates of corners of bounding boxes associated with respective tokens. Visual information includes text formatting—such as bold, italic, and highlights—associated with particular text in documents. Visual information also includes a size of text, a clarity of text, and the lightness and darkness of text.

The electronic document analysis engine 110 obtains textual, positional, and visual information about tokens in a document by extracting text content, bounding box information, and visual information from an optical character recognition application 118. The text content may include alphanumeric characters. The bounding box information includes coordinates identifying a top-most pixel, bottom-most pixel, left-most pixel, and right-most pixel of a token. The visual data includes digital data representing the appearance of the token. For example, the visual data may describe the shape, brightness, angle, and color of token characters. For each token in a set of tokens from each document of the pre-training data set 121, the pre-trained machine learning model 112 generates a vector as an output value. The values of the vector parameters encode the textual, positional, and visual relationships among the respective tokens.

The vectors encoding semantic information, positional information, and textual information of tokens in the documents of the pre-training data set 121 may also encode semantic, positional and visual relationships among the tokens in the documents. Semantic relationships include: words with particular meanings being frequently present in the same documents; text tokens being frequently arranged in a same order in a document; numerical tokens being associated with particular text tokens in documents; and different words with similar meanings being used interchangeably in documents. In an example set of documents including invoices, semantic relationships include identifying numbers and text that are part of a business name, addresses, invoice data, a product count, product description terms, and values associated with products. Positional relationships include particular types of tokens that are located at particular positions in a document relative to other types of tokens. In an example set of documents including invoices, positional relationships include, for example, identifying a numerical value (such as value representing a price) on a same line as a text product description. Another positional relationship may include identifying address information at a top of a document. Visual relationships include visual elements, such as shaded or colored shapes in a document, lines separating sections of a document, sizes of tokens in the document and color data associated with tokens and shapes in the document. In the example set of documents including invoices, visual relationships may include text associated with a document header including a document title, invoice number, and business name being in a different font and style than text that describes a list of products and prices.

Subsequent to generating the pre-trained machine learning model 112, the machine learning model engine 111 re-trains the model on a particular category of document to generate a fine-tuned machine learning model 113. The fine-tuned machine learning model 113 (a) generates vectors representing semantic, positional, and visual information of the tokens of the fine-tuning training data set 122, and (b) identifies key-value pairs among the tokens of the fine-tuning training data set 122. The fine-tuned machine learning model 113 identifies the key-value pairs based, at least in part, on the vector encodings that encode semantic relationships, positional relationships, and visual relationships among components of the key-value pairs. Retraining the model on the particular category of document includes adjusting the parameters of the model—such as the coefficients and offsets of a neural network—based on the training data set comprising the particular category of document.

The electronic document analysis engine 110 obtains a set of authentic document images 123 of a particular document type. The authentic document images 123 are images of historical documents. For example, the authentic document images 123 may be images of actual invoices, receipts, or forms. The authentic document images 123 include metadata associated with the images. The metadata includes text content data, bounding box data, and key-value labels. For example, metadata associated with a particular invoice identifies text content associated with an item as a key-type token and text associated with a quantity and a price as value-type tokens associated with the key-type token. According to one embodiment, a user may generate metadata identifying a key-value pair associated with a particular token via the user interface 116.

According to one embodiment, the authentic document images 123 of one particular document category exclude document images of every other document type. In an embodiment in which the particular document category is an invoice-type document, the set of historical documents that make up the authentic document images 123 excludes book excerpts, articles, journal entries, and magazine articles and excerpts. Similarly, in an example in which the particular document category is a form-type document (such as a form providing health history data or a form providing employment data), the set of historical documents excludes book excerpts, articles, journal entries, and magazine articles and excerpts, invoices, and receipts.

According to one embodiment, the unlabeled pre-training data set 121 includes both the particular document category and other document categories. For example, in an embodiment in which the particular document category is an invoice, the unlabeled pre-training data set 121 includes book excerpts, articles, journal entries, magazine articles and excerpts, and forms and also includes invoices. According to one embodiment, the unlabeled pre-training data set 121 is selected to include the particular type of document for which the model will be re-trained. For example, in an embodiment in which the re-trained model is re-trained to identify key-value pairs in invoices, the pre-training data set 121 is selected to include a particular percentage of invoice-type documents. According to an alternative embodiment, the unlabeled pre-training data set 121 excludes the particular document category and includes only the other document categories.

The electronic document analysis engine 110 obtains a set of synthetic documents images 124 for documents of the particular document type. The electronic document analysis engine 110 may obtain the synthetic document images 124 from a third-party, such as an existing repository of images. Alternatively, the electronic document analysis engine 110 may generate synthetic document images 124 with a synthetic document generator 117.

The synthetic document generator 117 generates synthetic document images 124 of a particular document category by applying a defined set of rules. For example, a set of rules may specify that for an invoice-type document, the document image must include ten features, such as a source entity, a destination entity, a date, one or more items, one or more prices associated with the items, and a quantity associated with the items. The rules may specify particular content attributes, position attributes, and image attributes associated with the items. For example, an address may include random number and name values arranged in a particular format at a particular location in the document image. Likewise, an item name may be a random name, quantity may be a random number, and price may be a number randomly selected from a range of price values. According to one or more embodiments, the synthetic document generator 117 generates synthetic document images 124 of a particular document category by applying a defined set of content-modification rules to an authentic document image of the same document type. The synthetic document generator 117 may alter text content and text position of tokens within an authentic document within predefined ranges according to the content-modification rules to generate a synthetic document image.

The system generates synthetic document images 124 including labels indicating key-value pairs in the synthetic document images 124. For example, an authentic invoice may include key-value pairs associated with a source business name and address, a recipient name and address, and purchased item names and prices. The system generates a synthetic document to include the same key-value pairs having different values and/or positions within a document image of the synthetic document.

The electronic document analysis engine 110 generates a fine-tuning training data set 122 including authentic document images 123 and synthetic document images 124. For example, if the set of authentic document images 123 includes five thousand document images of a particular survey form, and if a user indicates via a user interface 116 that ten thousand data points are desired to fine-tune the machine learning model, the synthetic document generator 117 may generate five thousand additional synthetic document images of the particular survey form. The set of ten thousand document images, including authentic and synthetically-generated images, makes up the fine-tuning training data set 122.

The fine-tuning training data set 122 includes, for each token pair in a corresponding document image, text content information describing a content of text, bounding box information describing a bounding box surrounding the text, position information describing a position of the text in an image of its corresponding authentic or synthetic document, and a label identifying a key-value pair to which the token belongs. The system may obtain text content data, bounding box data, and image data for tokens in the authentic historical documents based on human-performed labeling via the user interface 116. The system may obtain text content data, bounding box data, and image data for tokens in the synthetic documents based on computer-generated values. For example, when the synthetic document generator 117 generates the synthetic document image, the synthetic document generator 117 also generates the text content, bounding box, and image data for each token in the synthetic document image.

The machine learning model engine 111 re-trains the pre-trained machine learning model 112 using the fine-tuning training data set 122 to generate the fine-tuned machine learning model 113. While the pre-trained machine learning model 112 is trained using images of different categories of non-labeled documents, the machine learning model engine 111 trains the fine-tuned machine learning model 113 using labeled document images of only a particular document type.

The machine learning model engine 111 generates the fine-tuned machine learning model 113 to identify key-value pairs in a document image using a machine learning algorithm. The machine learning algorithm may include supervised components and/or unsupervised components. Various types of algorithms may be used, such as linear regression, logistic regression, linear discriminant analysis, classification and regression trees, naïve Bayes, k-nearest neighbors, learning vector quantization, support vector machine, bagging and random forest, boosting, backpropagation, and/or clustering. According to one embodiment, the system pre-trains the machine learning model using a data set of different document categories, unlabeled documents, and an algorithm implementing unsupervised machine learning techniques, and excluding supervised machine learning techniques. The system re-trains the same machine learning model using the new data set of authentic and synthetic documents of one particular document type, which are labeled documents (or which include machine-learning training labels), using an algorithm implementing supervised machine learning techniques, and excluding unsupervised machine learning techniques.

In an embodiment, a set of training data 122 of authentic historical documents and synthetic documents of the same document category includes datasets and associated labels. The datasets are associated with input variables (e.g., token content and token position within a document image) for the target model f. The associated labels are associated with the output variable (e.g., a particular key-value pair associated with a token) of the target model f. The training data may be updated based on, for example, feedback on the accuracy of the current target model f. Updated training data is fed back into the machine learning algorithm, which in turn updates the target model f.

A machine learning algorithm generates a target model f such that the target model f best fits the datasets of training data to the labels of the training data. Additionally, or alternatively, a machine learning algorithm generates a target model f such that when the target model f is applied to the datasets of the training data, a maximum number of results determined by the target model f matches the labels of the training data.

In an embodiment, a machine learning algorithm can be iterated to identify key-value pairs in documents of a particular type using vectors encoding semantic information, positional information, and visual information to reveal semantic relationships, positional relationships, and visual relationships among tokens in document images of a particular document type. For example, pre-training the machine learning model on the pre-training set of documents of different document types may result in a particular output vector encoding semantic, positional, and visual relationships of textual content in the document. Fine-tuning the machine learning model on the fine-tuning training data set of the particular document type results in a different output vector encoding semantic, positional, and visual information of textual content in the document. The fine-tuned machine learning model is further configured to identify key-value pair relationships among tokens in the document.

A post-model processing engine 114 performs rule-based post-model processing to further refine key-value pair predictions of the fine-tuned machine learning model 113. The post-model processing engine 114 (1) generates groups of key-value pairs and (2) removes unreasonable predictions. For example, the machine learning model 113 may identify tokens within three lines of text as values corresponding to a recipient key. The post-model processing engine 114 groups the three lines of text as a single value corresponding to the same recipient key. According to another example, the machine learning model may group tokens on two separate rows of an invoice as a same key corresponding to different values. The post-model processing engine 114 separates the two rows into two separate keys. The post-model processing engine 114 further generates two key-value pairs corresponding, respectively, to the separate rows and the prices associated with the separate rows. The post-model processing engine 114 performs the rule-based post-model processing using the text data, text box data, and image data which was used to train the fine-tuned machine learning model 113. For example, a rule may specify that if a bounding box associated with a group of tokens in one row and corresponding to a particular location in an invoice is a predefined distance from a bounding box associated with a group of tokens in another row, the post-model processing engine 114 should group the content within the separate rows as separate keys and/or values of key/value pairs. Another rule may specify that if a bounding box associated with a group of tokens in one row and corresponding to a different location in an invoice is a predefined distance from a bounding box associated with a group of tokens in another row, the post-model processing engine 114 should group the content within the separate rows as the same keys and/or values of key/value pairs. Another rule may specify that two tokens including particular text content should be grouped into a single key/value.

A document management system 130 obtains document images from document-generating platforms 140. According to one example, the document management system 130 is an accounting system that stores invoices generated by vendors. According to another example, the document management system 130 is a health data management system that stores patient health data forms obtained from physicians' offices. According to yet another example, the document management system 130 is an employment opportunity platform that stores images of resumes obtained from recruiters. According to yet another example, the document management system 130 is a business opportunity tracking platform that stores images of business cards obtained from sales representatives.

According to one or more embodiments, the document images 126 include one or more of portable data format (PDF) type documents, Joint Photographic Experts Group (JPEG) documents, Graphics Interface Format (GIF) type documents, Portable Network Graphics (PNG) type documents, and Tagged Image File Format (TIFF) type documents.

The system 100 stores the document images 126 from the document management system 130 in the data repository 120. The electronic document analysis engine 110 identifies key-value pairs in the document images 126 by providing the document images 126 to the fine-tuned machine learning model 113. For example, the electronic document analysis engine 110 may generate textual, positional, and visual metadata associated with a document image 126 by applying the optical character recognition application 118 to the document image. The OCR application 118 may include a tokenizer to identify tokens in the document image. The OCR application 118 identifies text content in the tokens, bounding box information associated with the tokens, and image data associated with the tokens. The machine learning model engine 111 converts the document image and corresponding metadata into an input vector. The machine learning model engine 111 applies the input vector to the fine-tuned machine learning model 113 to generate an output identifying key-value pairs within the document.

The electronic document analysis engine 110 stores or displays the document image 126 with the key-value pairs 125 identified by the fine-tuned machine learning model 113. The electronic document analysis engine 110 may store a resulting annotated document image in the data repository 120, for example. The annotated document image may highlight sets of bounding boxes associated with respective key-value pairs in the image. In addition, or in the alternative, the system may store values generated by the machine learning model as entries in a spreadsheet or records in a database. A record may include a column for "key" and a column for "value." The system may store the text content identified in the particular document associated with a key of a key-value pair in a field in the "key" column and the text content identified in the document associated with a value for the key-value pair in a "value" field. In addition, or in the alternative, the system may store position information, such as bounding box coordinates, associated with respective keys and values in corresponding fields.

Additional embodiments and/or examples relating to computer networks are described below in Section 5, titled "Computer Networks and Cloud Networks."

In one or more embodiments, a data repository 120 is any type of storage unit and/or device (e.g., a file system, database, collection of tables, or any other storage mechanism) for storing data. Further, a data repository 120 may include multiple different storage units and/or devices. The multiple different storage units and/or devices may or may not be of the same type or located at the same physical site. Further, a data repository 120 may be implemented or may execute on the same computing system as the electronic document analysis engine 110. Alternatively, or additionally, a data repository 120 may be implemented or executed on a computing system separate from the electronic document analysis engine 110. A data repository 120 may be communicatively coupled to the electronic document analysis engine 110 via a direct connection or via a network.

Information describing a pre-training data set 121, a fine-tuning training data set 122, document images 126, and key-value pair data 125 may be implemented across any of components within the system 100. However, this information is illustrated within the data repository 120 for purposes of clarity and explanation.

In one or more embodiments, the electronic document analysis engine 110 refers to hardware and/or software configured to perform operations described herein for identifying key-value pair data in document images based on pre-training and fine-tuning a machine learning model. Examples of operations for training a machine learning model to perform key-value pair extraction are described below with reference to FIGS. 2A and 2B.

In an embodiment, the electronic document analysis engine 110 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

In one or more embodiments, interface 116 refers to hardware and/or software configured to facilitate communications between a user and the electronic document analysis engine 110. Interface 116 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 116 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface 116 is specified in one or more other languages, such as Java, C, or C++.

3. Multi-Stage Machine Learning Model Training for Key-Value Extraction

Figure 2A:
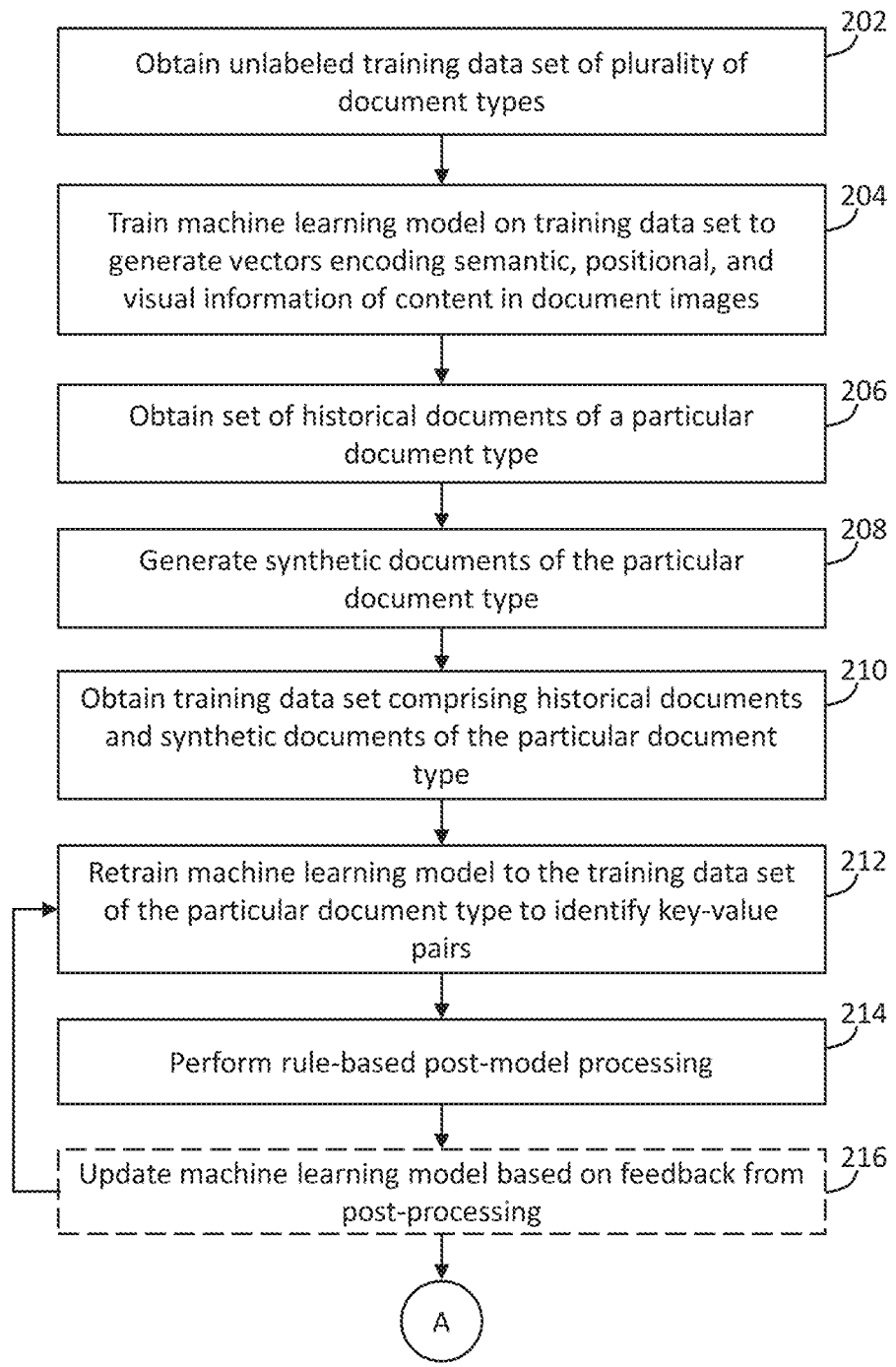
FIGS. 2A and 2B illustrate an example set of operations for training a machine learning model to identify key-value pairs in documents in accordance with one or more embodiments.
Figure 2B:
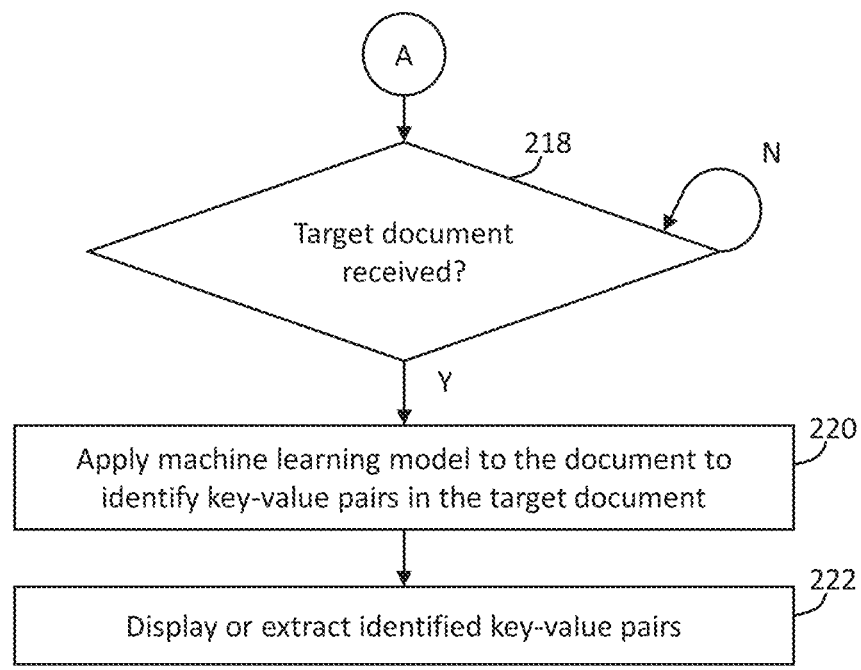

FIGS. 2A and 2B illustrate an example set of operations for training and applying a machine learning model to extract key-value pairs from documents in accordance with one or more embodiments. One or more operations illustrated in FIG. 2 may be modified, rearranged, or omitted all together. Accordingly, the particular sequence of operations illustrated in FIGS. 2A and 2B should not be construed as limiting the scope of one or more embodiments.

A system obtains a set of unlabeled documents for training a machine learning model (Operation 202). The set of unlabeled documents includes documents of different categories, including: book excerpts, articles, journal entries, magazine articles and excerpts, invoices, and receipts. The set of unlabeled documents includes images of historical documents. For example, book excerpts include images of words on a page, page numbers, and chapter headings. Articles include images of text arranged in multiple columns of a page, graphs, pictures, and footnotes associated with the text. Magazine excerpts include images of words on a page, page numbers, pictures, and graphics. The set of unlabeled documents includes digital images of historical documents. For example, book excerpts, articles, and journal entries are digital images of published documents.

The system trains the machine learning model on a training data set of the unlabeled documents to generate vectors encoding semantic, positional, and visual information of tokens in the documents. (Operation 204). The system may identify tokens within the document using a tokenizer. The semantic information includes the meaning of a token, such as the meaning of text content. Positional information includes, for example, Cartesian coordinates of corners of bounding boxes associated with respective tokens. Visual information includes text formatting—such as bold, italic, and highlights—associated with particular text in documents. Visual information also includes a size of text, a clarity of text, and the lightness and darkness of text. The system may obtain information about tokens in a document by extracting text content, bounding box data, and image data from an optical character recognition application.

In some examples, one or more elements of a machine learning engine may use a machine learning algorithm to encode the semantic, positional, and visual information associated with tokens in documents. A machine learning algorithm is an algorithm that can be iterated to learn a target model f that best maps a set of input variables to an output variable, using a set of training data. The machine learning algorithm may include unsupervised components to learn the relationships among the tokens in the documents. For example, the system may apply a clustering technique to apply similar vector values to similar pieces of data corresponding to tokens in the documents. In addition, or in the alternative, the system may apply a dimension reduction technique to apply vector values indicating whether a data point is relevant to a data set. Various types of algorithms may be used, including k-means clustering, hidden Markov model, DBSCAN clustering, principal component analysis, T-distributed Stochastic Neighbor Embedding (t-SNE), singular value decomposition, and Association rule predictive analytics. A machine learning algorithm generates a target model f such that the target model/best fits the datasets of training data to the labels of the training data.

According to an example embodiment, the machine learning model is a neural network. Training a neural network includes: (a) obtaining a training data set, (b) iteratively applying the training data set to a neural network to generate output vectors for data points representing tokens in the unlabeled documents of the training data set, and (c) adjusting weights and offsets (i.e., "parameters of the neural network") associated with the formulae that make up the neurons of the neural network based on a loss function that compares values associated with the generated labels to values associated with test labels. The neurons of the neural network include activation functions to specify bounds for a value output by the neurons. The activation functions may include differentiable nonlinear activation functions, such as rectified linear activation (ReLU) functions, logistic-type functions, or hyperbolic tangent-type functions. Each neuron receives the values of each neuron of the previous layer, applies a weight to each value of the previous layer, and applies one or more offsets to the combined values of the previous layer. The activation function constrains a range of possible output values from a neuron. A sigmoid-type activation function converts the neuron value to a value between 0 and 1. A ReLU-type activation function converts the neuron value to 0, if the neuron value is negative, and to the output value if the neuron value is positive. The ReLU-type activation function may also be scaled to output a value between 0 and 1. For example, after applying weights and an offset value to the values from the previous layer for one neuron, the system may scale the neuron value to a value between −1 and +1. The system may then apply the ReLU-type activation function to generate a neuron output value between 0 and 1. The system trains the neural network using the training data set, a test data set, and a verification data set until the labels generated by the trained neural network are within a specified level of accuracy, such as 98% accuracy. Training the neural network on the training data set of unlabeled documents includes: generating an input vector to the neural network based on values obtained by applying a token extraction application to a document, and obtaining an output vector from the neural network. The output vector encodes semantic, positional, and visual information of one or more tokens in an unlabeled training document.

According to one embodiment, the output vector encodes semantic, positional, and visual information of one or more tokens in an unlabeled training document. For example, a clustering technique for training the neural network may group particular tokens into clusters based on semantic, positional, and visual relationships identified by the neural network.

The system obtains a set of historical documents of a particular document category (Operation 206). The set of historical documents includes labeled documents. The labels include key-value labels. In other words, a label associated with a particular token indicates whether the token is part of a particular key-value pair. The set of historical documents of the particular document category excludes documents of every other document type. For example, in an embodiment in which the particular document category is an invoice-type document, the set of historical documents excludes book excerpts, articles, journal entries, and magazine articles and excerpts. Similarly, in an example in which the particular document category is a form-type document (such as a form providing health history data or a form providing employment data), the set of historical documents excludes book excerpts, articles, journal entries, and magazine articles and excerpts, invoices, and receipts. In one or more embodiments, the set of historical documents are of a category including that includes, on each page, a plurality of key-value pairs. For example, the set of historical documents may include a set of historical invoices, a set of historical receipts, or a set of historical forms.

According to one embodiment, the unlabeled training data set includes both the particular document category and other document categories. For example, in an embodiment in which the particular document category is an invoice, the unlabeled training data set includes book excerpts, articles, journal entries, magazine articles and excerpts, and forms and also includes invoices. According to an alternative embodiment, the unlabeled training data set excludes the particular document category and includes only the other document categories. For example, in an embodiment in which the particular document category is an invoice, the unlabeled training data set includes book excerpts, articles, journal entries, magazine articles and excerpts, and forms and excludes invoices.

The system obtains a set of synthetic documents of the particular document category (Operation 208). According to one embodiment, the system generates the set of synthetic documents based on one or more of the authentic historical documents. For example, in an embodiment in which the particular document category is an invoice, the system may select an authentic invoice for generating one or more synthetic invoices. The system may apply a set of document-modification rules to modify one or more characteristics of the invoice. For example, the set of document-modification rules may include content modification rules and position modification rules. A content-modification rule may include rules to modify business names, street names, street numbers, dates, invoice item names, price values, and quantity values. The content-modification rules may specify particular ranges of modification values. For example, a price-modification rule may specify a range of price values in which the system may modify the price. The system may apply a randomizing algorithm to modify a price value to any value within the specified range. A content-modification rule may increase or decrease a number of invoice items within predefined thresholds. Position-modification rules may specify locations or a range of locations to which tokens and groups of tokens may be moved. For example, a rule may specify that a recipient name of an invoice may be moved apart from the recipient address by up to twelve pixels. A rule may specify that a delivery address of an invoice may be moved from one side of an image of a document to an opposite side of the image of the document.

The system may obtain pre-generated synthetic documents of the particular document category and/or generate the set of synthetic documents of the particular document category until a number of documents in the data set including the authentic historical documents and the synthetic documents is equal to a predetermined number of documents. For example, the system may obtain one thousand authentic invoices. The system may require ten thousand invoices to train a machine learning model. The system may generate nine thousand synthetic invoices to obtain a training data set of ten thousand invoices.

The system generates synthetic documents including labels indicating key-value pairs in the synthetic documents. For example, an authentic invoice may include key-value pairs associated with a source business name and address, a recipient name and address, and purchased item names and prices. The system generates a synthetic document to include the same key-value pairs having different values and/or positions within a document image of the synthetic document.

The system obtains a new training data set of documents comprising the authentic historical documents of the particular document category and the synthetic documents of the particular document category (Operation 210). The training data set includes, for each key-value pair in a corresponding document, text information, positional, and visual information. Text information includes alphanumeric values of text. Positional information includes coordinates of boundaries of text. Visual information includes information describing a size, shading, and angle of text. The training data set also includes, for each token in a key-value pair, a label identifying the key-value pair to which the token belongs. The system may obtain text content data, positional data, and visual data for tokens in the authentic historical documents based on human-performed labeling. The system may obtain text content data, positional data, and visual data for tokens in the synthetic documents based on computer-generated values. For example, when the system generates the synthetic document, the system also generates the text content, bounding box, and visual data for each token in the synthetic document.

The system retrains the machine learning model on the new data set corresponding to the particular document category (Operation 212). The system uses a machine learning algorithm to identify key-value pairs in a document. The machine learning algorithm may include supervised components and/or unsupervised components. Various types of algorithms may be used, such as linear regression, logistic regression, linear discriminant analysis, classification and regression trees, naïve Bayes, k-nearest neighbors, learning vector quantization, support vector machine, bagging and random forest, boosting, backpropagation, and/or clustering. According to one embodiment, the system pretrains the machine learning model using a data set of different document categories, unlabeled documents, and an algorithm implementing unsupervised machine learning techniques, and excluding supervised machine learning techniques. The system re-trains the same machine learning model using the new data set of authentic and synthetic documents of one particular document type, which are labeled documents (or which include machine-learning training labels), using an algorithm implementing supervised machine learning techniques, and excluding unsupervised machine learning techniques.

In an embodiment, a set of training data of authentic historical documents and synthetic documents of the same document category includes datasets and associated labels. The datasets are associated with input variables (e.g., token content and token position within a document image) for the target model f. The associated labels are associated with the output variable (e.g., a particular key-value pair associated with a token) of the target model f. The training data may be updated based on, for example, feedback on the accuracy of the current target model f. Updated training data is fed back into the machine learning algorithm, which in turn updates the target model f.

A machine learning algorithm generates a target model f such that the target model f best fits the datasets of training data to the labels of the training data. Additionally, or alternatively, a machine learning algorithm generates a target model f such that when the target model f is applied to the datasets of the training data, a maximum number of results determined by the target model f matches the labels of the training data.

In an embodiment, a machine learning algorithm can be iterated to learn relationships between tokens in document images and key-value pairs to which the tokens belong.

Referring to the example above in which the machine learning model is a neural network, retraining the neural network includes (a) obtaining the labeled training data set, (b) iteratively applying the labeled training data set to the pre-trained neural network to generate key-value labels for data points representing tokens in the documents of the training data set, and (c) re-adjusting the weights and offsets associated with the formulae that make up the neurons of the neural network based on a loss function that compares values associated with the generated key-value labels to values associated with key-value labels of the labeled training data set.

The machine learning algorithm may be iterated to identify key-value pairs in documents of a particular type using vectors encoding semantic information, positional information, and visual information to reveal semantic relationships, positional relationships, and visual relationships among tokens in document images of a particular document type. For example, providing a particular document of a particular document type to the pre-trained machine learning model, trained on the pre-training set of documents of different document types, would result in a particular output vector encoding semantic, positional, and visual relationships of textual content in the document. Applying the same document to the fine-tuned machine learning model, which has been trained on the fine-tuning training data set of the particular document type, would result in a different output vector (a) encoding semantic, positional, and visual relationships of textual content in the document, and (b) identifying key-value pair relationships among tokens in the document.

The system performs rule-based post-model processing to further refine key-value pair designations (Operation 214). The rule-based post-model processing generates groups of key-value pairs. For example, the machine learning model may identify tokens within three lines of text as values corresponding to a recipient key. The system performs post-model processing to group the three lines of text as a single value corresponding to the same recipient key. The rule-based post-model processing also removes unreasonable predictions. For example, the machine learning model may group tokens on two separate rows of an invoice as a same key corresponding to different values. The system performs rule-based post-model processing to separate the two rows into two separate keys. The system further generates two key-value pairs corresponding, respectively, to the separate rows and the prices associated with the separate rows. The system performs the rule-based post-model processing using the text data, text box data, and image data which was used to train the machine learning model. For example, a rule may specify that if a bounding box associated with a group of tokens in one row and corresponding to a particular location in an invoice is a predefined distance from a bounding box associated with a group of tokens in another row, the system should group the content within the separate rows as separate keys and/or values of key/value pairs. Another rule may specify that if a bounding box associated with a group of tokens in one row and corresponding to a different location in an invoice is a predefined distance from a bounding box associated with a group of tokens in another row, the system should group the content within the separate rows as the same keys and/or values of key/value pairs. Another rule may specify that two tokens including particular text content should be grouped into a single key/value. Another rule may specify that two tokens including particular text content should be grouped into separate keys/values.

Based on the post-model processing, the system may further update the machine learning model (Operation 216). The system may update the training data set to include adjusted vector values associated with particular tokens to result in different groupings for key/value pairs by the machine learning model.

Upon training the machine learning model on the data set associated with a particular document type, the system determines whether a document of the document category is received (Operation 218). For example, a system may perform an analysis of a set of invoices, a set of forms, such as health data forms, employment forms, survey forms, or other documents including key-value pairs stored in a data repository. The system may sequentially provide the documents to the machine learning model for analysis.

If a document of the particular document category is received, the system applies the machine learning model to the document to identify key-value pairs in the target document (Operation 220). For each token in the document, the system identifies a key-value pair associated with the token.

The system stores or displays the document with the key-value pairs identified by the machine learning model (Operation 222). The system may store a resulting annotated document as an annotated image. The image may highlight sets of bounding boxes associated with respective key-value pairs in the image. In addition, or in the alternative, the system may store values generated by the machine learning model as entries in a spreadsheet or records in a database. A record may include a column for "key" and a column for "value." The system may store the text content identified in the particular document associated with a key of a key-value pair in a field in the "key" column and the text content identified in the document associated with a value for the key-value pair in a "value" field. In addition, or in the alternative, the system may store position information, such as bounding box coordinates, associated with respective keys and values in corresponding fields.

Machine learning models encounter difficulty identifying key-value pairs in documents when a training data set is small and when the documents in the training data set have a high variability of document layout and/or content. In one or more embodiments, the system may implement the two-staged approach to training a machine learning model to identify key-value pairs in a document based on identifying a size of a training data set is less than a threshold size. For example, the system may determine that if a size of a data set for a particular category of documents is less than ten thousand documents, the system should first pre-train the machine learning model in an unsupervised process with unlabeled data using a data set including documents of other categories. The system may then retrain the machine learning model in a supervised process using a labeled training data set of the particular document category. In addition, the system may determine that if the training data set of documents of the particular category is less than the threshold, the system should supplement a set of authentic historical documents with synthetic documents. The threshold may be set by a user or by applying rules associated with a variation among document layout structures. For example, the system may categorize documents as high variation, medium variation, and low variation. A high-variation document may have key-value pair elements—such as address fields, price fields, name fields, item fields, question fields, or other fields—that are in substantially different locations among different documents of the same category. In contrast, a low-variation document may have key-value pair elements that are typically in the same location in different documents. High-variation document categories may require a larger training data set to obtain a desired level of accuracy in machine learning model predictions. Low-variation document categories may require a relatively smaller size training data set to obtain the desired level of accuracy.

4. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

Figure 3A:
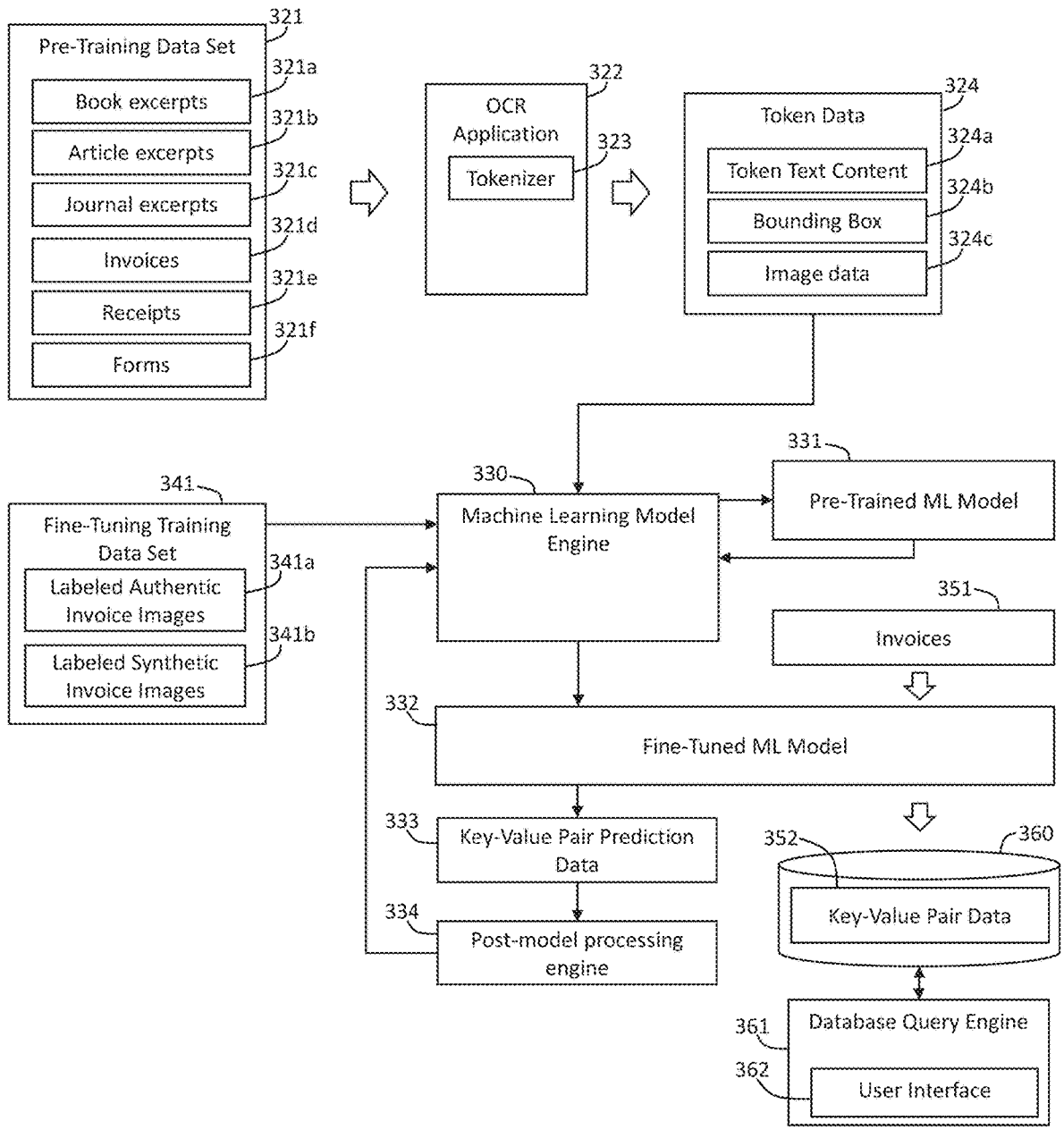
FIGS. 3A-3C illustrate an example embodiment of a system for identifying key-value pairs in documents.
Figure 3B:
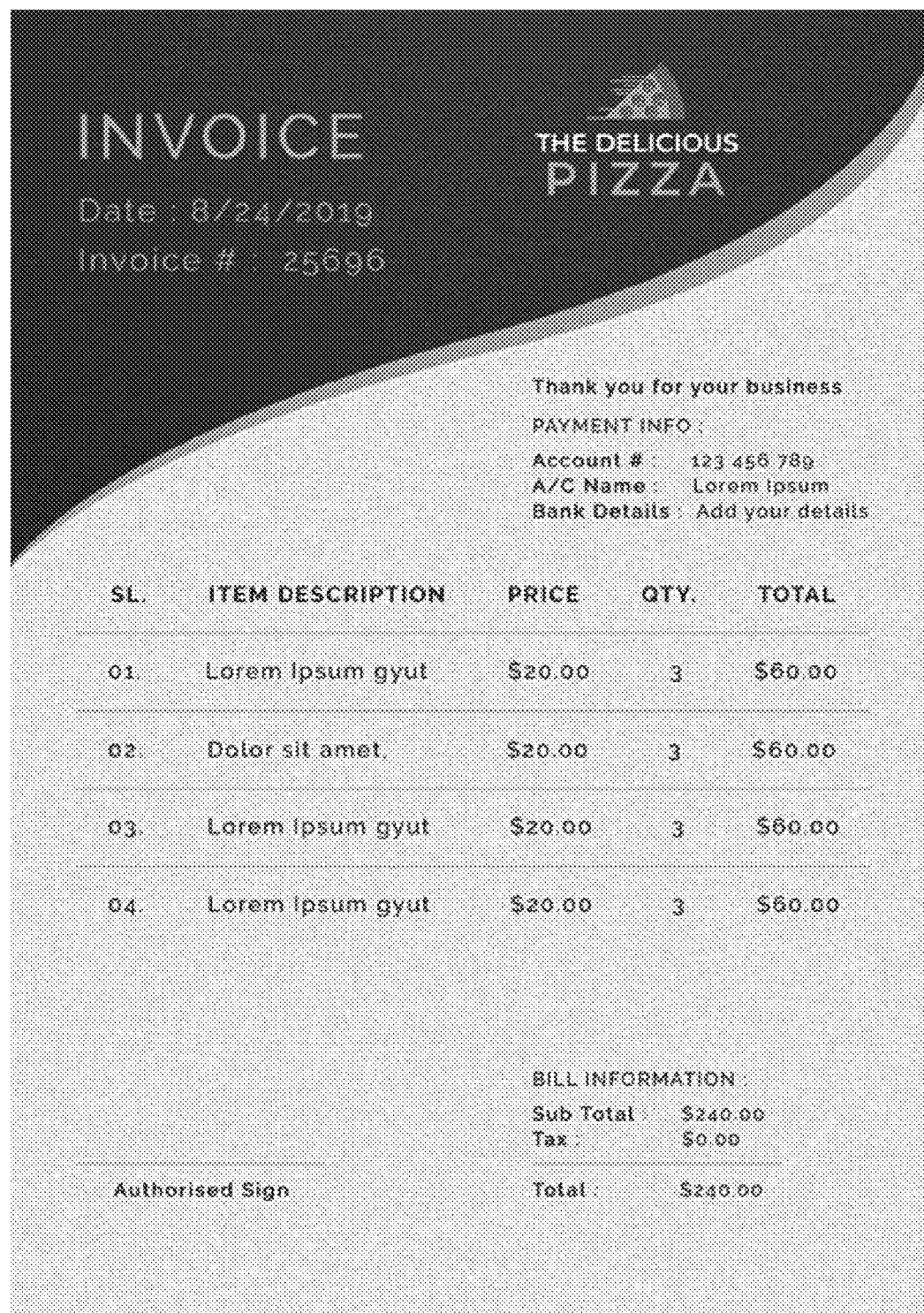
Figure 3C:
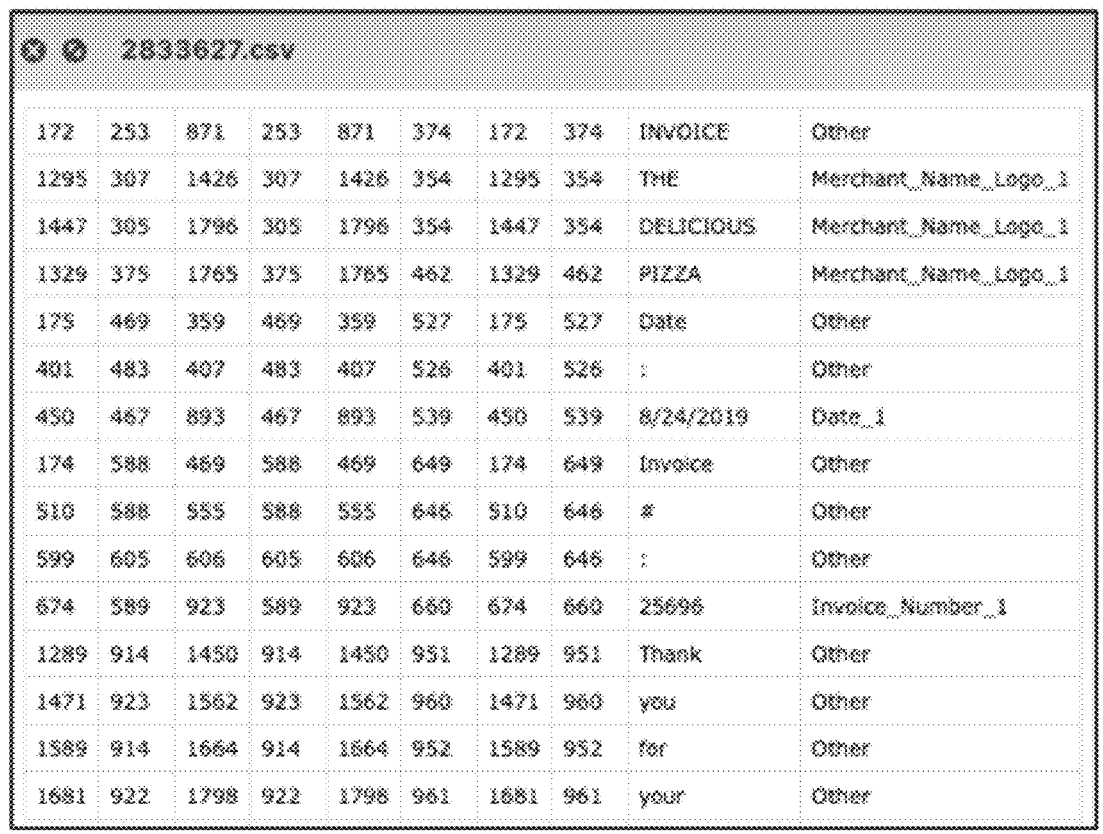

FIGS. 3A to 3C illustrate a system 300 for identifying key-value pairs in invoices, according to one or more embodiments. A pre-training data set 321 includes images from multiple different categories of documents, such as book excerpts 321a, article excerpts 321b, journal excerpts 321c, invoices 321d, receipts 321e, and forms 321f. An optical character recognition application 322 analyzes the documents to generate token data 324. A tokenizer 323 identifies tokens within the documents, including sets of consecutive characters that make up words, dates, numbers, or punctuation. The OCR application 322 identifies, for each token, token text content 324a, bounding box attributes 324b, and image data 324c. Token text content 324a includes the alphanumeric characters that make up the token. Bounding box attributes 324b include pixel locations of a top, bottom, and sides of a token. Image data 324c includes visual data for the token, e.g., color data, brightness data, and shape data associated with the image of the token, as well as a position of the token within the image. The pre-training data set 321 includes non-labeled data. In other words, key-value pairs are not identified in the pre-training data set 321.

A machine learning model engine 330 applies an unsupervised-type machine learning algorithm to the non-labeled pre-training data set 321 to generate a pre-trained machine learning model 331. For example, the machine learning model engine 330 may apply a k-means clustering algorithm to the non-labeled pre-training data set 321 to set and adjust parameter values of the pre-trained machine learning model 331. The pre-trained machine learning model 331 learns relationships among the tokens identified in the non-labeled pre-training data set 321.

The machine learning model engine 330 applies a supervised-type machine learning algorithm to the set of labeled, fine-tuning training data 341 to further train the pre-trained machine learning model 331 to generate a fine-tuned machine learning model 332. For example, the machine learning model engine 330 may iteratively apply a linear regression algorithm to adjust the parameters of the fine-tuned machine learning model 332 when data from the fine-tuning training data set 341 is provided to the model 332 as input data. The labeled, fine-tuning training data 341 includes authentic invoice images 341a and corresponding labels, and synthetic invoice images 341b and corresponding labels. The labels include, for each token identified in the images 341a and 341b, an indication whether the token is a key or value in a key-value pair, and an identifier associated with a key-value pair to which the token belongs.

FIG. 3B illustrates an example of an authentic invoice image 342. The authentic invoice image 342 includes graphics, an invoice number, a customer account number, item descriptions, and item prices.

FIG. 3C illustrates an example of label data associated with the authentic invoice image 342. The label data includes: (a) token text content (e.g., "INVOICE," "THE," "PIZZA," "8/24/2019," etc.), and (b) additional token data, such as pixel values associated with a bounding box around the token and a position of the token in the document.

The fine-tuned machine learning model 332 generates key-value pair predictions 333 corresponding to tokens in the labeled authentic invoice images 341a and the labeled synthetic invoice images 341b. A post-model processing engine 334 applies a set of rules to the key-value pair prediction data 333 for each invoice image to further refine the key-value pair predictions 333. In particular, the post-model processing engine 334 (1) generates groups of key-value pairs and (2) removes unreasonable predictions.

The machine learning model engine 330 retrains the fine-tuned machine learning model 332 based on the updated key-value pair prediction data generated by the post-model processing engine 334.

The fine-tuned machine learning model 332 obtains token data associated with invoices 351. For example, an invoice 351 may be provided to the OCR application 322 and tokenizer 323 to identify tokens in the invoice 351, position data associated with the tokens, bounding box data, visual data, and text content data. The fine-tuned machine learning model 332 generates key-value pair data 352 based on the invoice image data. The system 300 stores the key-value pair data 352 in a database 360. A database query engine 361 includes a user interface 362 accessible by a user to generate a query to obtain invoice data from the database 360. For example, a user may generate a query to obtain a quantity of items associated with invoice number "123445." The database query engine 361 may access the key-value pair data 352 in the database 360 to return a query response identifying items, quantities, and prices associated with the query number specified in the query. In addition, the database query engine 361 may display on a display device of the user interface 362 an image of the requested invoice with the key-value pairs associated with item quantities highlighted by a graphical element.

5. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QOS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID.

Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets received from the source device are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

7. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
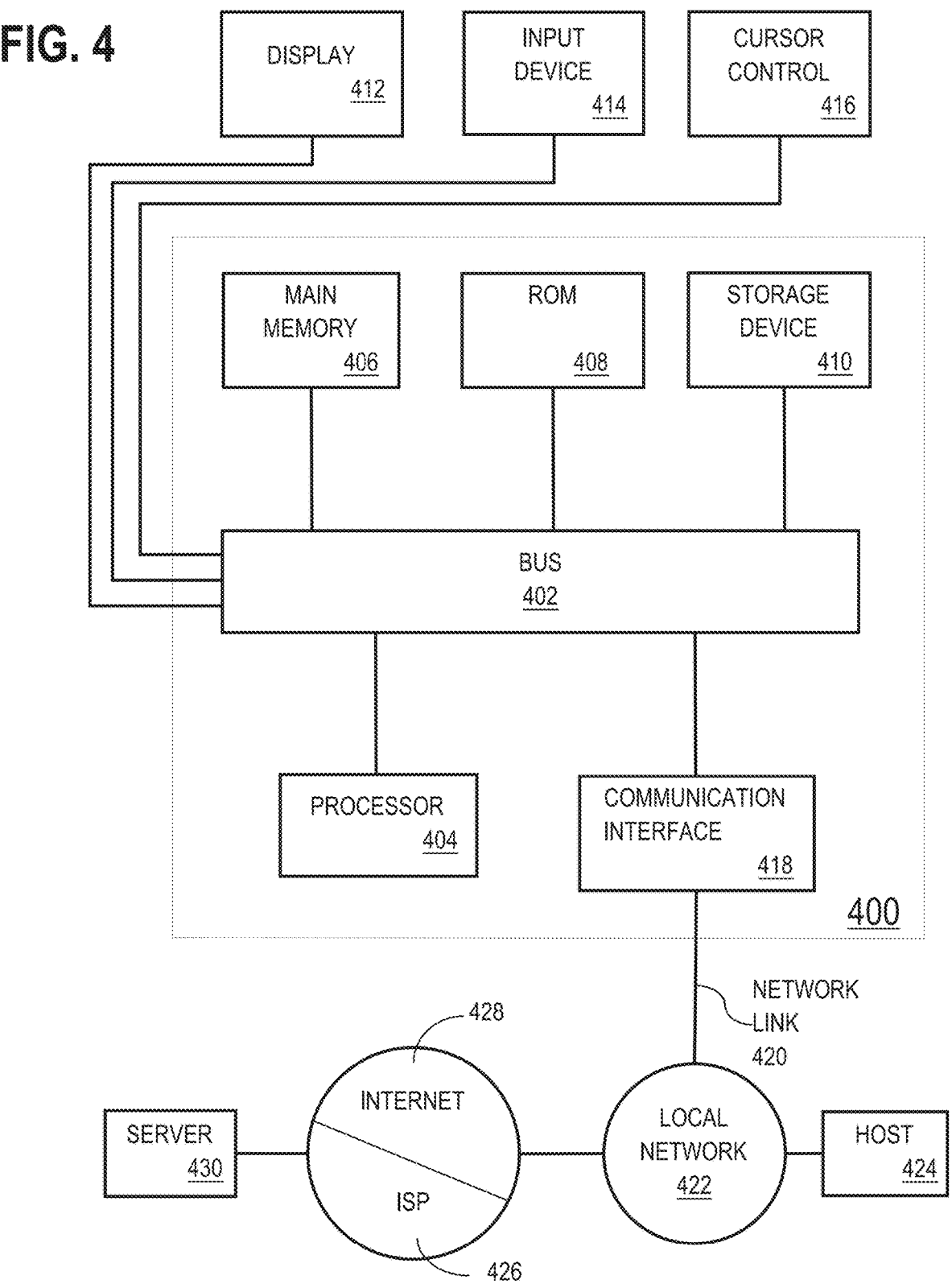
FIG. 4 shows a block diagram that illustrates a computer system in accordance with one or more embodiments.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
  executing a first training stage for training a machine learning model to generate first vectors encoding semantic information, and at least one of positional and visual information, of first textual content within documents at least by:
    accessing a first plurality of training documents associated with a plurality of document categories, the first plurality of training documents including first textual information, first positional information, and first visual information;
    training the machine learning model using the first plurality of training documents associated with the plurality of document categories to generate the first vectors encoding the semantic information, and the at least one of the positional and the visual information based on the first textual information, and at least one of the first positional information and the first visual information;
    wherein the first training stage generates a first set of parameters for application of the machine learning model;
  executing a second training stage for customizing the machine learning model to (a) generate second vectors to encode semantic information, and at least one of positional information and visual information of second textual content within documents of a particular document category and (b) extract key-value pairs at least by:
    accessing a second plurality of training documents associated with the particular document category, the second plurality of training documents being tagged with key-value pairs and including second textual information, second positional information, and second visual information;
    training the machine learning model using the second plurality of training documents associated with the particular document category to identify key-value pairs based at least in part on vector encodings of the second textual content that encode semantic relationships, and at least one of positional and visual relationships, between components of the key-value pairs, wherein training the mahcine learning model using the second plurality of training documents results in a trained machien learning model, and wherein the second training stage fine-tunes the first set of parameters to generate a second set of parameters for application of the machine learning model; and applying the trained machine learning model with the second set of parameters to a first document of the particular document category to extract a first plurality of key-value pairs from the first document.

2. The non-transitory computer readable medium of claim 1, wherein training the machine learning model using the second plurality of training documents comprises training the machine learning model to identify the key-value pairs based at least in part on analyzing vector encodings of the second textual content to determine each of: (a) semantic relationships, (b) positional relationships, and (c) visual relationships between components of the key-value pairs.

3. The non-transitory computer readable medium of claim 1, wherein training the machine learning model using the first plurality of training documents includes generating, by the machine learning model for each document of the first plurality of training documents, a vector encoding the semantic relationships, positional relationships, and visual relationships among the respective textual content in each respective document of the first plurality of training documents.

4. The non-transitory computer readable medium of claim 1, the operations further comprising:
accessing feedback data corresponding to the key-value pairs extracted from the second plurality of training documents using the trained machine learning model; and
updating the machine learning model based on the feedback data.

5. The non-transitory computer readable medium of claim 4, wherein accessing the feedback data corresponding to the key-value pairs extracted from the second plurality of training documents using the trained machine learning model comprises:
applying a set of post-model rules to the key-value pairs to group tokens identified as separate values associated with a same key of a key-value pair into a single value of the key-value pair.

6. The non-transitory computer readable medium of claim 5, wherein grouping the tokens identified as separate values associated with a same key of a key-value pair into the single value of the key-value pair comprises expanding a bounding box associated with the single value to encompass a first token identified by the machine learning model as a first value and a second token identified by the machine learning model as a second value.

7. The non-transitory computer readable medium of claim 4, wherein obtaining the feedback data corresponding to the key-value pairs extracted from the second plurality of training documents using the trained machine learning model comprises:
applying a set of post-model rules to the key-value pairs to separate a single value of a key-value pair identified by the machine learning model into a first value corresponding to a first token and a second value corresponding to a second token.

8. The non-transitory computer readable medium of claim 1, wherein the first plurality of training documents includes documents of the particular document category.

9. The non-transitory computer readable medium of claim 1, wherein the particular document category comprises an invoice category.

10. The non-transitory computer readable medium of claim 1, wherein the first plurality of training documents includes documents of a different category than the particular document category, and
wherein the second plurality of training documents excludes documents of any category different from the particular document category.

11. The non-transitory computer readable medium of claim 1, wherein the second positional information includes bounding box location data associated with tokens in the second plurality of training documents, and
wherein the second visual information includes at least one of size data, shape data, and color data associated with the tokens in the second plurality of training documents.

12. The non-transitory computer readable medium of claim 1, wherein the operations further comprise:
identifying tokens in each document of the first plurality of training documents; and
for each token identified in the first plurality of training documents: extracting text content, and at least one of (a) bounding box location data and (b) shape and color data associated with the token.

13. The non-transitory computer readable medium of claim 1, wherein obtaining the second plurality of training documents associated with the particular document category comprises:
obtaining a first subset of training documents comprising historical documents of the particular document category; and
obtaining a second subset of training documents comprising synthetic documents of the particular document category.

14. The non-transitory computer readable medium of claim 13, wherein obtaining the second subset of training documents comprises applying a set of document-generation rules to generate an image of a document of the particular document category and key-value pair labels associated with tokens in the image of the document.

15. The non-transitory computer readable medium of claim 1, wherein the first plurality of training documents are unlabeled training documents,
wherein the second plurality of training documents are labeled training documents,
wherein training the machine learning model using the first plurality of training documents comprises applying a first algorithm implementing an unsupervised machine learning operation to the first plurality of training documents, and
wherein training the machine learning model using the second plurality of training documents comprises applying a second algorithm implementing a supervised machine learning operation to the second plurality of training documents.

16. A method comprising:
executing a first training stage for training a machine learning model to generate first vectors encoding semantic information, and at least one of positional and visual information, of first textual content within documents at least by:

accessing a first plurality of training documents associated with a plurality of document categories, the first plurality of training documents including first textual information, first positional information, and first visual information;

training the machine learning model using the first plurality of training documents associated with the plurality of document categories to generate the first vectors encoding the semantic information, and the at least one of the positional and the visual information based on the first textual information, and at least one of the first positional information and the first visual information;

wherein the first training stage generates a first set of parameters for application of the machine learning model;

executing a second training stage for customizing the machine learning model to (a) generate second vectors to encode semantic information, and at least one of positional information and visual information of second textual content within documents of a particular document category and (b) extract key-value pairs at least by:

accessing a second plurality of training documents associated with the particular document category, the second plurality of training documents being tagged with key-value pairs and including second textual information, second positional information, and second visual information;

training the machine learning model using the second plurality of training documents associated with the particular document category to identify key-value pairs based at least in part on analyzing vector encodings of the second textual content to determine semantic relationships, and at least one of positional and visual relationships, between components of the key-value pairs, wherein training the machine learning model using the second plurality of training documents results in a trained machine learning model, and wherein the second training stage fine-tunes the first set of parameters to generate a second set of parameters for application of the machine learning model; and applying the trained machine learning model with the second set of parameters to a first document of the particular document category to extract a first plurality of key-value pairs from the first document.

17. The method of claim 16, wherein training the machine learning model using the second plurality of training documents comprises training the machine learning model to identify the key-value pairs based at least in part on analyzing vector encodings of the second textual content to determine each of: (a) semantic relationships, (b) positional relationships, and (c) visual relationships between components of the key-value pairs.

18. The method of claim 16, wherein training the machine learning model using the first plurality of training documents includes generating, by the machine learning model for each document of the first plurality of training documents, a vector encoding the semantic relationships, positional relationships, and visual relationships among the respective textual content in each respective document of the first plurality of training documents.

19. The method of claim 16, further comprising:
accessing feedback data corresponding to the key-value pairs extracted from the second plurality of training documents using the trained machine learning model; and
updating the machine learning model based on the feedback data.

20. A system comprising:
one or more processors; and
memory storing instructions that, when executed by the one or more processors, cause the system to perform operations comprising:
executing a first training stage for training a machine learning model to generate first vectors encoding semantic information, and at least one of positional and visual information, of first textual content within documents at least by:

accessing a first plurality of training documents associated with a plurality of document categories, the first plurality of training documents including first textual information, first positional information, and first visual information;

training the machine learning model using the first plurality of training documents associated with the plurality of document categories to generate the first vectors encoding the semantic information, and the at least one of the positional and the visual information based on the first textual information, and at least one of the first positional information and the first visual information;

wherein the first training stage generates a first set of parameters for application of the machine learning model;

executing a second training stage for customizing the machine learning model to (a) generate second vectors to encode semantic information, and at least one of positional information and visual information of second textual content within documents of a particular document category and (b) extract key-value pairs at least by:

accessing a second plurality of training documents associated with the particular document category, the second plurality of training documents being tagged with key-value pairs and including second textual information, second positional information, and second visual information;

training the machine learning model using the second plurality of training documents associated with the particular document category to identify key-value pairs based at least in part on vector encodings of the second textual content that encode semantic relationships, and at least one of positional and visual relationships, between components of the key-value pairs, wherein training the machine learning model using the second plurality of training documents results in a trained machine learning model, and wherein the second training stage fine-tunes the first set of parameters to generate a second set of parameters for application of the machine learning model; and applying the trained machine learning model with the second set of parameters to a first document of the particular document category to extract a first plurality of key-value pairs from the first document.

* * * * *